Figure 7:
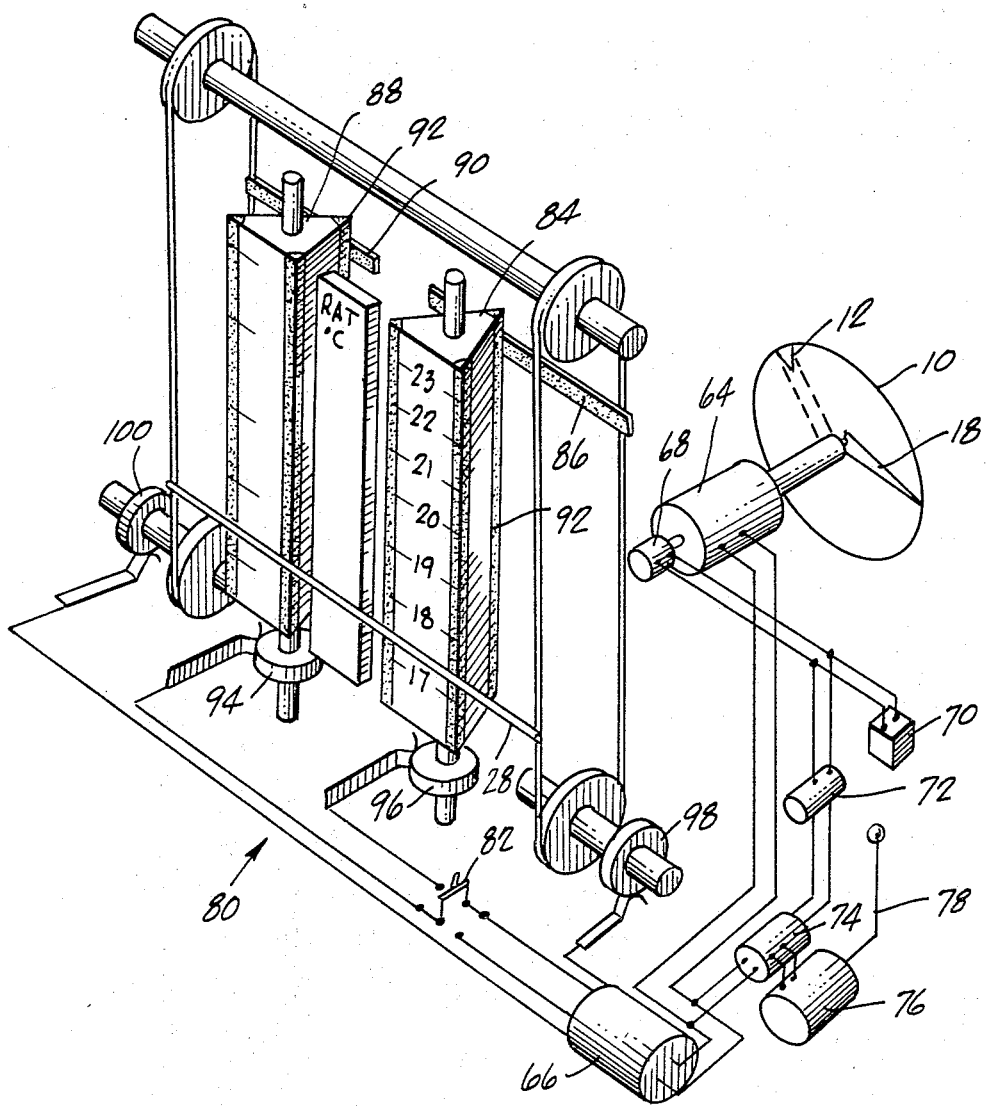

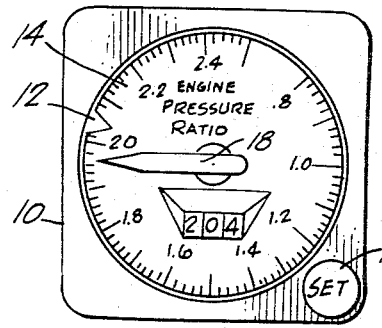
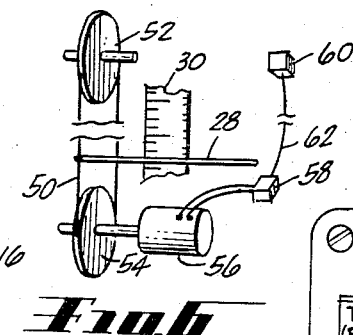
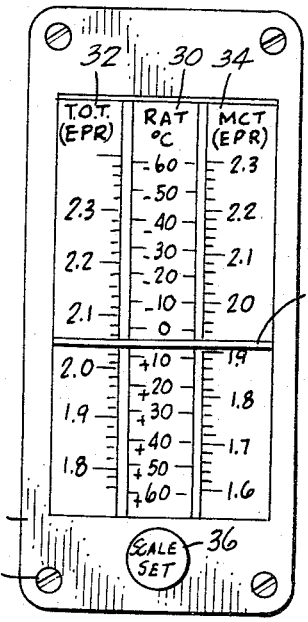
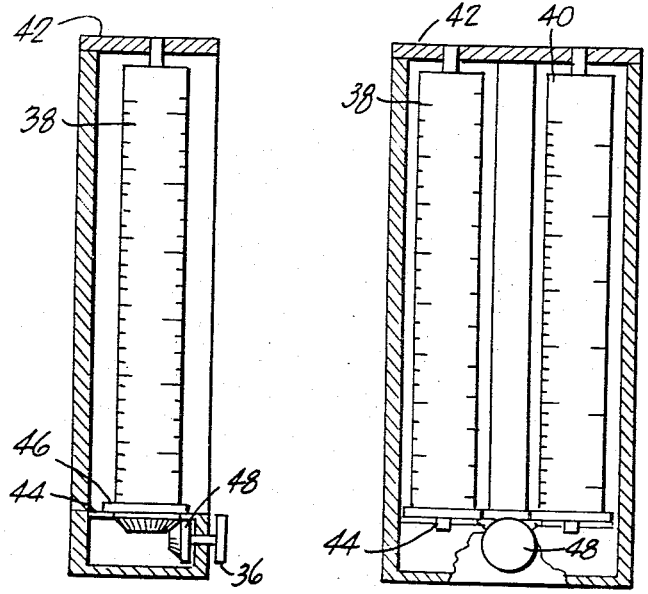
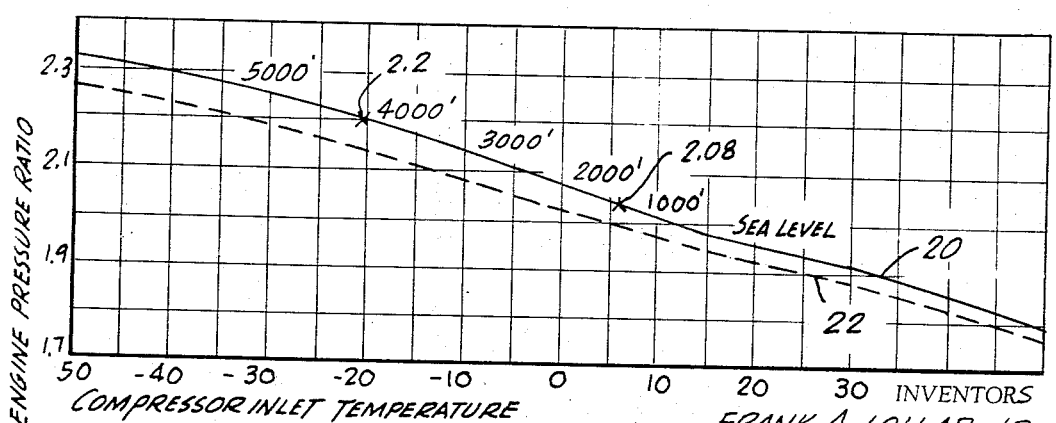

United States Patent Office 3,338,050
Patented Aug. 29, 1967

3,338,050
ENGINE THRUST SETTING INDICATOR
AND COMPUTER
Kenneth G. Ferrel, Los Alamitos, and Frank A. Lollar, Jr., Garden Grove, Calif., assignors, by mesne assignments, to McDonnell Douglas Corporation, Santa Monica, Calif., a corporation of Maryland
Filed Jan. 20, 1966, Ser. No. 521,877
10 Claims. (Cl. 60—39.28)

This invention relates to a turbine engine thrust setting indicator and computer and more particularly to such indicator and computer that continuously correlates the ram air temperature with the required engine pressure ratio (EPR) for selected engine thrust ratings and operating conditions.

Thrust, as such, cannot be measured directly on an installed jet engine. Jet engine speed (r.p.m.) has no direct relationship to thrust and should not be used as a measure of the thrust being developed. Therefore, some other engine variable such as turbine discharge pressure divided by compressor inlet pressure (engine pressure ratio) must be employed as an indication of the thrust being developed by the engine.

In order for an aircraft to obtain the maximum performance for which it was certified, the engines must be operated at an exact thrust level or rating. The aircraft manufacturer prepares a set of charts which give the EPR's required to develop a specific thrust level or rating, (i.e., take-off, maximum continuous, maximum cruise, etc.). The EPR is a function of the following variables: ram air temperature, pressure altitude and amount of bleed air being extracted from the engine to operate other systems.

Prior to the present invention, the appropriate power setting or engine pressure ratio (EPR) is obtained by the pilot reading his ram air temperature indicator and giving this value to the flight engineer. The flight engineer, in turn, extracts the correct engine pressure ratio value from several pages of charts, and when this value has been relayed back to the pilot, the pilot then adjusts the throttles to obtain the desired EPR. This requires considerable work and time at critical moments, such as during the takeoff and climb of the aircraft, during which time all flight personnel are busily pre-occupied with other duties. Moreover, in certain types of modern aircraft, the position of flight engineer has been eliminated and the pilot himself must now obtain his own throttle setting information.

The alternatives to providing for proper throttle settings are that if the throttles are not advanced enough, the engines are developing less thrust than was intended, which under certain conditions, where maximum thrust is required, could be disastrous; if the throttles are advanced too much, the engines are operating at an unsafe condition unknown to the pilot, and may under repeated abuses fail in a catastrophic manner.

It is therefore an object of the present invention to provide for an instrument whereby required throttle adjustments may be quickly and easily indicated to enable the pilot to make the proper engine thrust settings for any current maneuver with a minimum distraction from other flight duties.

Another object is to provide for an instrument making possible the maximum and correct utilization of turbine engines in aircraft.

Another object is to provide for the automatic positioning of the movable index mark on the engine pressure ratio indicator instrument to the proper setting, thereby eliminating visual and manual transfer of information from the thrust setting indicator to the EPR indicator.

Another object is to provide for the generation of error signals resulting from combining electrical outputs indicative of the required engine pressure ratio and the actual engine pressure ratio.

Another object is to provide for the automatic positioning of the engine throttles to obtain the correct engine thrust by the application of error signals to a throttle servo-motor.

Another object is to provide for the generation of error signals resulting from combining electrical outputs indicative of the required EPR and the actual EPR for applying to a throttle servo-motor such that the throttle is automatically positioned to obtain the correct EPR or thrust.

Other objects will become apparent as a description of the present invention proceeds, having reference to the drawings, wherein:

FIGURE 1 is a pictorial view of an engine pressure ratio indicator instrument in a pilot's cockpit, FIGURE 2 shows one of many graphs needed to enable a flight engineer or pilot to obtain the correct engine pressure ratio information, FIGURE 3 is a pictorial view of the dial of the engine thrust setting indicator, FIGURE 4 is a front view, FIGURE 5 is a side view of the gauge scale interchanging mechanism, FIGURE 6 is a schematic view illustrating the actuation of the temperature indicator, and FIGURE 7 is a schematic view illustrating one mode of transferring information from the engine thrust setting indicator to the engine pressure ratio indicator, and for automatically positioning the engine throttle to obtain the correct engine thrust.

Referring now to FIG. 1, there is shown the engine pressure ratio gauge 10 having a movable index 12 rotatable about the face 14 in response to rotation of a manual operation button 16. This dial is rotated on the basis of information that determines the desired engine pressure ratio, for, or during, a particular maneuver. Needle 18 is connected to appropriate sensing structure, not shown, which indicates the actual engine pressure ratio as the engine performs. The needle 18 is caused to rotate about the face of the dial in accordance with movement of the throttles as the pilot attempts to maintain a proper engine power setting by aligning this pointer with movable index 12. It is the information that determines the position of movable index 12 by rotation of manual button 16 that is obtained from the engine thrust setting computer and indicator which comprises the present invention.

The above information as to the desired pressure ratio is, until the present invention, determined by a series of graphs, a typical one of which is shown in FIG. 2. These graphs are made by engineers of the particular aircraft involved, after first obtaining thrust information from the engine manufacturer relating to static takeoff thrust, in-flight takeoff thrust, maximum continuous thrust, maximum climb thrust, and maximum cruise thrust. Across the bottom of the graph are numerals indicating the compressor inlet temperature or ram air temperature from which the desired engine pressure ratio may be calculated. Numerals representing these values are shown extending upwardly from the left of the graph. The graph shows two lines 20 and 22. Line 20 is under a no-airbleed condition and curve 22 is used when airbleed from the engine is being used to operate air conditioning apparatus or anti-ice systems. Various altitude levels which also comprise engine pressure ratio limits are indicated on the curves, as well. This chart is one of perhaps a dozen pages of graphs that the flight engineer or pilot has in a thrust setting booklet for this particular aircraft.

In use, the flight engineer, or pilot, first selects the corresponding page with the desired maneuver, such as a takeoff, for example. The flight engineer then selects the proper line 20 or 22, depending upon the airbleed conditions, such as whether the air conditioning system or anti-ice systems are in use. Having selected the right line, the flight engineer obtains the ram air temperature reading from the pilot. The flight engineer must then observe that the airport altitude reading on the scale must be higher than the indicated temperature reading on the curve. In other words, the lower of the two EPR's obtained from either temperature or altitude inputs must be selected as the correct EPR. For example, assume a ram air temperature reading of −20 and an altitude of 5000 feet. The altitude reading is higher on the curve than the temperature reading. The lesser engine pressure ratio reading corresponding to the −20 degree temperature must be read and used. At the point of −20° intersection with line 20 is a value of approximately 2.2 which is the desired engine pressure ratio on this chart. On the other hand, if the actual airport elevation was 2000 feet, the engine pressure at that altitude must be read instead of the −20° temperature reading. In this case the reading would be approximately 2.08. When this engine pressure ratio information is given to the pilot, he rotates instrument knob 16 in FIGURE 1 until the movable index 12 is at the desired position. Thereafter, he moves the throttle until needle 18 corresponds with this movable index 12. As soon as the aircraft becomes air borne and the wheels are retracted in their housing, the pilot then wishes to go into a maximum climb mode or maneuver. This requires another chart which the flight engineer must refer to, corresponding to a maximum continuous thrust, a maximum climb or some other lesser thrust level indicated by the pilot. Having selected the proper page in his manual, the flight engineer repeats this procedure to give to the pilot a new engine pressure ratio reading. Since modern aircraft climb rapidly, new altitude settings must be noted as well as changes in the ram air temperature as the altitude changes. This rate of change of temperature may be on the order of 10 to 12 degrees per minute and by the time the flight engineer has given the new thrust settings to the pilot and the pilot has made the necessary power setting correction, it is already obsolete because of the change in ram air temperature due to the elapsed time between reading the temperature and the extraction of the required EPR from the charts. The takeoff and early climb and emergency information must be continually computed, all at a time when the pilot and flight engineer are busy with other instruments and actuators. After climbing to the selected altitude, new charts are then necessary in order to fly at the maximum cruise thrust setting. It should be noted that the maximum cruise thrust setting can be computed at a more leisurely pace.

Reference is now made to FIGURE 3 which shows the face panel of the thrust setting indicator and computer comprising the present invention. Here there is shown a mounting 24 which sets into the pilot's cockpit instrument panel such as by means of screws 26. A horizontally indicating bar 28 moves vertically in accordance with a suitable temperature sensing device, not shown, to indicate the ram air temperature as shown by the indicia on readout panel 30. Readout panel 32 has takeoff thrust indicia thereon to indicate the engine pressure ratio information from which the pilot may then set the movable index 12 in FIGURE 1. Also on this panel 32 is altitude information with the thousands of feet indicated in circles so that the pilot may readily ascertain the lowest value, that indicated by the indicator 28 or the engine pressure ratio value for the altitude at which the aircraft is taking off. It is understood that the lesser of the two values is the one to which the pilot sets movable index 12 in FIGURE 1.

Because the aircraft immediately goes into a climb mode after takeoff, it is desirable to transfer indicating information to the panel 34 on the right for maximum climb thrust and to obtain the engine pressure ratio reading therefrom with a minimum of transfer difficulty. For this reason, the two panels are shown, one on either side of the ram air temperature panel 30.

Scale set knob 36 is for the purpose of rapidly changing the scales for the current maneuver desired, that is whether a takeoff, climb, maximum cruise or an emergency thrust setting information is desired. As can be seen by reference to FIGURES 4 and 5, a plurality of columns of indicia may be placed on some rotatable posts 38, 40. These posts have vertical axes terminating in the top 42 and base 44 of the instrument. Suitable apparatus may be provided for rotating these posts to the proper column of information. As shown, knob 36 may be manually rotated and, by toothed or friction wheels or gears such as 46, 48, this movement may be transferred to the posts.

As shown in FIGURE 6, temperature indicator 28 moves up and down over the temperature indicia scale 30 by means of an endless belt 50 mounted on rollers 52, 54. This belt is moved by servo-motor 56 which in turn is actuated by a servo-amplifier module 58, which in turn is connected to a temperature sensing device 60. In many commercial apparatus the temperature sensing device constitutes one leg of a Wheatstone bridge whose output varies according to temperature, the output determining the position of the servo-motor 56.

In FIGURE 7 there is shown one mode of positioning the movable index 12 on the engine pressure ratio gauge 10 automatically. Here the movable index 12 is moved by means of a servo-motor 64 which, in turn, is actuated by transducer 66. This transducer, in turn, is responsive to the position of the ram air temperature indicator 28, as will be more fully explained. In this manner movable index 12 or gauge 10 reads the same information as indicator 28 on the engine pressure ratio indicator, shown in FIGURE 3. Needle 18 on engine pressure ratio gauge 10 is actuated by servo-motor 68 in response to suitable sensing structure 70 in a conventional manner known in the art. In accordance with the present invention this information is also fed to transducer 72. The output from transducer 66 and the output from transducer 72 are compared in comparator 74 from which a differential signal output is fed to servo-motor 76 to actuate throttle 78. When throttle 78 has been set properly to achieve the desired thrust, needle 18 will be aligned with movable index 12.

The engine thrust setting computer and indicator 80 is adapted to energize transducer 66 from either of two circuits, depending upon the position of switch 82. As shown, the circuit closed by the switch 82 includes scale post 84 and wiper arm 86. The other circuit, available upon actuation of switch 82, includes scale post 88 and wiper arm 90. Scale posts 84, 88 are rotatable to provide selected scales under indicator arm 28 which is movable to correspond to ram air temperature in a manner described in connection with FIG. 6. Each of these scales has a corresponding resistive edge 92 against which wiper arms 86, 90 move, to thus vary the input to transducer 66. Each edge has a resistivity that corresponds with its associated scale viewed behind indicator 28. Since the posts rotate, slip rings 94, 96 provide circuit continuity with the various edges. Similarly, slip rings 98, 100 provide continuous electrical contact with wiper arms 86, 90 respectively.

It is apparent that any of the scales on scale posts 84 and 88 may be selected and positioned easily and quickly for viewing, and that switch 82 may be used to select the desired scale corresponding to the particular aircraft maneuver to be made. While the posts 84, 88 shown are adapted for three scales each, it is obvious that more or fewer scales may be used.

Obviously, many modifications, alterations and alternate embodiments to the whole device will readily occur to one skilled in the art, it being desired that these variations be considered as part of the present invention as defined by the appended claims.

What is claimed is:

1. In combination with an aircraft throttle, a ram air temperature gauge and an engine pressure ratio gauge, the method of obtaining the desired throttle setting for a given aircraft maneuver comprising the steps of:
   placing the proper engine pressure ratio information scale corresponding to a selected maneuver in alignment with a temperature indicator moving in accordance with ram air temperature whereby said temperature indicator also refers to indicia on said scale, and
   moving the engine throttle until the actual engine pressure ratio corresponds to that indicated by said engine pressure ratio gauge indicator.

2. The method as set forth in claim 1 wherein the engine pressure ratio information scale for a takeoff maneuver also has altitude indicia thereon, and the indicator on said engine pressure ratio gauge is set to the indicia on said engine pressure ratio scale of the lesser value, that relating to engine pressure ratio on said scale referred to by said temperature indicator.

3. In combination with an aircraft throttle, a ram air temperature gauge and an engine pressure ratio gauge, the method of obtaining the desired throttle setting for a given aircraft maneuver comprising the steps of:
   placing the proper engine pressure ratio information scale corresponding to a selected maneuver in alignment with a temperature indicator moving in accordance with ram air temperature whereby said temperature indicator also refers to indicia on said scale,
   setting an indicator on said engine pressure ratio gauge to the indicia thereon corresponding to the indicia on said scale referred to by the temperature gauge indicator, and
   moving the engine throttle until the actual engine gauge pressure ratio corresponds to that indicated by said engine pressure ratio gauge indicator.

4. An engine thrust gauge for indicating a recommended engine thrust for a selected aircraft maneuver,
   said gauge comprising a temperature scale and a movable indicator movable in response to ram air temperature,
   movable scale means adjacent said temperature scale and having selected scales with thrust information thereon for selected aircraft maneuvers,
   means for moving a selected scale to a position adjacent said temperature scale whereby thrust information for a selected maneuver is related to the engine ram air temperature by said indicator.

5. An engine thrust gauge for indicating recommended engine thrust values for selected aircraft maneuvers as claimed in claim 4 wherein a pair of movable scale means are positioned one on each side of said temperature scale.

6. An engine thrust gauge for indicating recommended engine thrust values for selected aircraft maneuvers as claimed in claim 4 in combination with means for automatically setting the throttle of an aircraft engine to obtain the indicated recommended thrust.

7. An engine thrust gauge for indicating recommended engine thrust values for selected aircraft maneuvers as claimed in claim 4 in combination with an engine pressure ratio gauge having means thereon for indicating actual engine pressure ratio values and selected values indicated by said thrust gauge.

8. An engine thrust gauge for indicating recommended engine thrust values for selected aircraft maneuvers as claimed in claim 7, wherein said engine pressure ratio gauge and said thrust gauge have means thereon and therebetween for automatically indicating on said pressure ratio gauge the selected values indicated by said thrust gauge.

9. An engine thrust gauge for indicating recommended engine thrust values for selected aircraft maneuvers as claimed in claim 8 wherein said movable scale means has resistance means thereon which, when in circuit, adjusts a voltage output corresponding to thrust information on a selected scale.

10. An engine thrust gauge for indicating a recommended engine thrust for a selected aircraft maneuver,
    said gauge comprising a ram air temperature scale and movable indicator movable in response to ram air temperature,
    movable scale means adjacent said temperature scale and having selected scales with thrust information thereon for selected aircraft maneuvers,
    means for moving a selected scale to a position adjacent said temperature scale whereby thrust information for a selected maneuver is related to the ram air temperature by said indicator.

References Cited

UNITED STATES PATENTS

| 3,077,110 | 2/1963 | Gold | 73—178 |
| 3,128,445 | 4/1964 | Hasford | 244—76 X |
| 3,181,353 | 5/1965 | Brahm et al. | 60—39.28 X |

JULIUS E. WEST, *Primary Examiner.*